United States Patent
Worden et al.

[11] Patent Number: 5,808,427
[45] Date of Patent: Sep. 15, 1998

[54] VEHICLE DRIVE CONTROL SYSTEM

[75] Inventors: James D. Worden, North Andover; Ricardo Espinosa, Townsend; Roderick T. Hinman, Natick; Gill A. Pratt, Lexington, all of Mass.

[73] Assignee: Solectria Corporation, Wilmington, Mass.

[21] Appl. No.: 651,842

[22] Filed: May 21, 1996

[51] Int. Cl.⁶ .................................................. H02P 7/28
[52] U.S. Cl. ............................ 318/139; 318/587; 318/10; 318/446; 180/65.1
[58] Field of Search .................... 180/65.1–65.8; 318/139, 580, 587, 6, 9–15, 646, 280–283, 286, 445–446

[56] References Cited

U.S. PATENT DOCUMENTS

| | | | |
|---|---|---|---|
| 4,253,399 | 3/1981 | Spigarelli | 105/62 R |
| 4,312,419 | 1/1982 | Noddings | 180/177 |
| 4,772,829 | 9/1988 | Pickering et al. | 318/139 |
| 4,905,115 | 2/1990 | Whidden et al. | 361/92 |
| 5,357,170 | 10/1994 | Luchaco et al. | 315/159 |
| 5,532,671 | 7/1996 | Bachman et al. | 340/438 |

*Primary Examiner*—David S. Martin
*Attorney, Agent, or Firm*—Hayes, Soloway, Hennessey, Grossman & Hage, P.C.

[57] ABSTRACT

In accordance with the present invention, an electric vehicle drive control system is provided. The system of the present invention controls the supply of actuating power to an electric motor for driving the vehicle. One preferred embodiment of the system permits a user to temporarily override a previously selected maximum power usage level for the motor so as to permit the amount of power supplied to the motor to be increased to a higher maximum power usage level.

30 Claims, 11 Drawing Sheets

VEHICLE DRIVE CONTROL SYSTEM

BACKGROUND OF THE INVENTION

1. Field of the Invention

The present invention relates generally to an electric vehicle drive control system for controlling the supply of actuating power to the vehicle's electric motor, and more specifically, to such a system that permits a user to select a maximum power usage level to be supplied to the motor from a plurality of maximum power supply magnitudes, and permits a user to override the maximum power usage level set so as to permit a higher level of power to be supplied to the motor.

2. Brief Description of Related Prior Art

In most conventional electric vehicles, an accelerator pedal mechanism is used as a throttle for controlling the amount (i.e., magnitude) of actuating power (i.e., power used to actuate the motor to drive the vehicle) supplied to the vehicle's motor from the vehicle's source of electric power (e.g., batteries and/or an electric generator) based upon the position of the pedal. A sensor determines the relative position of the pedal within its range of motion (i.e., from totally undepressed to being flush against the floor of the vehicle) and signals the pedal's relative position to a controller. Typically, additional signals indicative of the desired direction of motion of the vehicle (i.e., whether the driver intends for the vehicle to go forward or in reverse) also are supplied to controller. The controller then uses these signals to generate signals for controlling various switching mechanisms that control the amount and direction of actuating power supplied from the power source to the motor (e.g., a reversible motor).

Typically, the accelerator pedal mechanism used in conventional electrical vehicles tends to be extremely sensitive to changes in force applied to the pedal by the driver. Thus, relatively minor changes in force applied to the pedal by the driver can cause relatively major changes in position of the pedal. This can lead to erratic instantaneous increases and decreases in the amount of power being supplied to the motor as the driver, intending to have the vehicle undergo a relatively minor change in speed, changes the force being applied to the pedal by a correspondingly small amount, and then has to compensate when this results in an unexpectedly and/or undesirablely large change in vehicle speed and/or acceleration. This can reduce the effective range of the vehicle between replenishings of the power source (i.e., between recharging of the batteries and/or refilling of the generator's fuel tank), since relatively large amounts of instantaneous power are consumed by the motor during acceleration and deceleration of the vehicle, and this can result in rapid depletion of the electrical energy available from the source.

In an effort to overcome this problem, some prior art electric vehicles are equipped with an electromechanical mechanism for permitting the driver to select a single, arbitrary lower maximum magnitude of power (i.e., lower than the maximum magnitude of power that is physically possible to be delivered to the motor by the source). It has been found that by making the arbitrary lower maximum level of power sufficiently low, the instantaneous power consumption of the motor during acceleration and deceleration of the vehicle can be substantially reduced. This can substantially increase the maximum effective range of the vehicle between replenishings of the power source, but disadvantageously, also reduces the vehicle's maximum acceleration. This latter phenomenon can be frustrating to some drivers (e.g., in situations when high accelerations are desired, such as when passing another vehicle or merging onto traffic on a highway).

A further disadvantage of such conventional mechanisms results from the fact that such mechanisms only permit the user to select the single, arbitrary lower maximum magnitude of power. This can be both inconvenient and inefficient in situations wherein, given the driving conditions at the time, it would be optimal to have an intermediate level of forward power (i.e., in-between the absolute maximum level and the single lower level of power) supplied to the motor.

Examples of conventional techniques for controlling the power supply in electrical systems are disclosed in U.S. Pat. No. 4,312,419 to Noddings, U.S. Pat. No. 4,905,115, and U.S. Pat. No. 5,357,170 to Luchaco et al. However, none of these patents discloses or suggests any solution for overcoming the aforesaid and other disadvantages and drawbacks of the prior art.

SUMMARY OF THE INVENTION

In accordance with the present invention, an electric vehicle drive control system is provided which overcomes the aforesaid and other disadvantages and drawbacks of the prior art. One embodiment of the system of the present invention essentially comprises a controller for causing a magnitude of actuating power to be supplied to the motor for driving the vehicle based upon the position of a throttle. When the position of the throttle is within a certain range of positions, the controller causes the magnitude of the actuating power supplied to the motor to change as a substantially linear, continuous function of the position of the throttle up to a user-selected maximum magnitude. When the throttle is outside of the certain range of positions, the controller causes the magnitude of the actuating power supplied to the motor to change as a discontinuous step function to a higher magnitude than the user-selected maximum magnitude.

In this embodiment of the present invention, the throttle comprises at least one biasing spring connected to a floor of the vehicle and a pedal for resisting force applied to the pedal by the user (driver) to change position of the pedal. The spring includes at least first and second regions having different spring constants and being adapted to cause resistance to the force applied by the user to change as a step function when the throttle moves from inside to outside the certain range of positions and vice versa.

Preferably, in this embodiment, the user-selected maximum is selected by a user-actuable switch having at least three forward power level settings, and at least two other power settings. Preferably, the three forward power level settings include the absolute maximum power level settings and two arbitrarily lower maximum power level settings. Also preferably, the switch is continuously movable among the three forward settings (i.e., the switch is able to rest at positions in-between any of the three forward settings), and is discretely movable between the two other settings and from the other settings to at least one of the forward power settings (i.e., the switch is not able to rest at a position in-between the forward power settings and the other settings, or at a position in-between the other settings). The maximum power level selected by the switch changes substantially as a linear function of the position of the switch when the switch is among the forward power settings, but the maximum power level selected by the switch changes discontinuously when it moves from the forward power settings to the other settings, and also changes discontinuously when it moves from one of the other power settings to the other thereof.

These features of this embodiment of the present invention result in profound advantages over the prior art. For example, in this embodiment of the present invention, by positioning the throttle within the certain range of positions, a user is able to cause the actuating power supplied to the motor to be a linear function of the position of the throttle, up to the pre-selected maximum magnitude. However, by positioning the throttle outside of the certain range of positions, the user is able to cause the actuating power to increase as a step function to a higher magnitude than the user-selected maximum magnitude. Thus, advantageously, a user is able to keep the actuating power lower than the pre-selected maximum (e.g., at times when high accelerations are not required) by keeping the throttle within the certain range of positions, but is also able to temporarily "override" the pre-selected maximum and "step-up" the actuating power to a higher level (e.g., when higher degrees of acceleration are required) by moving the throttle to outside the certain range.

Also, the construction of the throttle in this embodiment of the present invention provides tactile feedback to the driver as to the current position of the throttle. That is, the driver is easily able to discern whether the throttle is within or outside the certain range of positions based upon the resisting force sensed by the driver (i.e., whether the force increases continuously or discontinuously and the amount of the force). Advantageously, this permits the user to be able to easily discern whether the vehicle is in an energy-saving or "overdrive" mode, and as a result of the increased amount of force required to keep the throttle outside of the certain range of positions, benignly encourages the user not to maintain operation in the "overdrive" mode for extended periods.

Further advantageously, since the user-actuable power switch of this embodiment of the present invention provides a substantial continuum of forward power level settings, a user is better able to select an optimal forward power level using the switch of this embodiment of the present invention than is possible according to the prior art.

These and other features and advantages of the present invention will become apparent as the following Detailed Description proceeds and upon reference to the Drawings, wherein like numerals depict like parts, and in which:

Although the following Detailed Description will proceed with reference being made to specific embodiments of the present invention, it should be understood that the present invention is not intended to be limited to these embodiments. Rather, many alternatives, modifications, and variations thereof will be apparent to those skilled in the art. Accordingly, the present invention should be viewed broadly, as being limited only as set forth in the hereinafter appended claims.

DETAILED DESCRIPTION OF PREFERRED EMBODIMENTS

Figure 1:
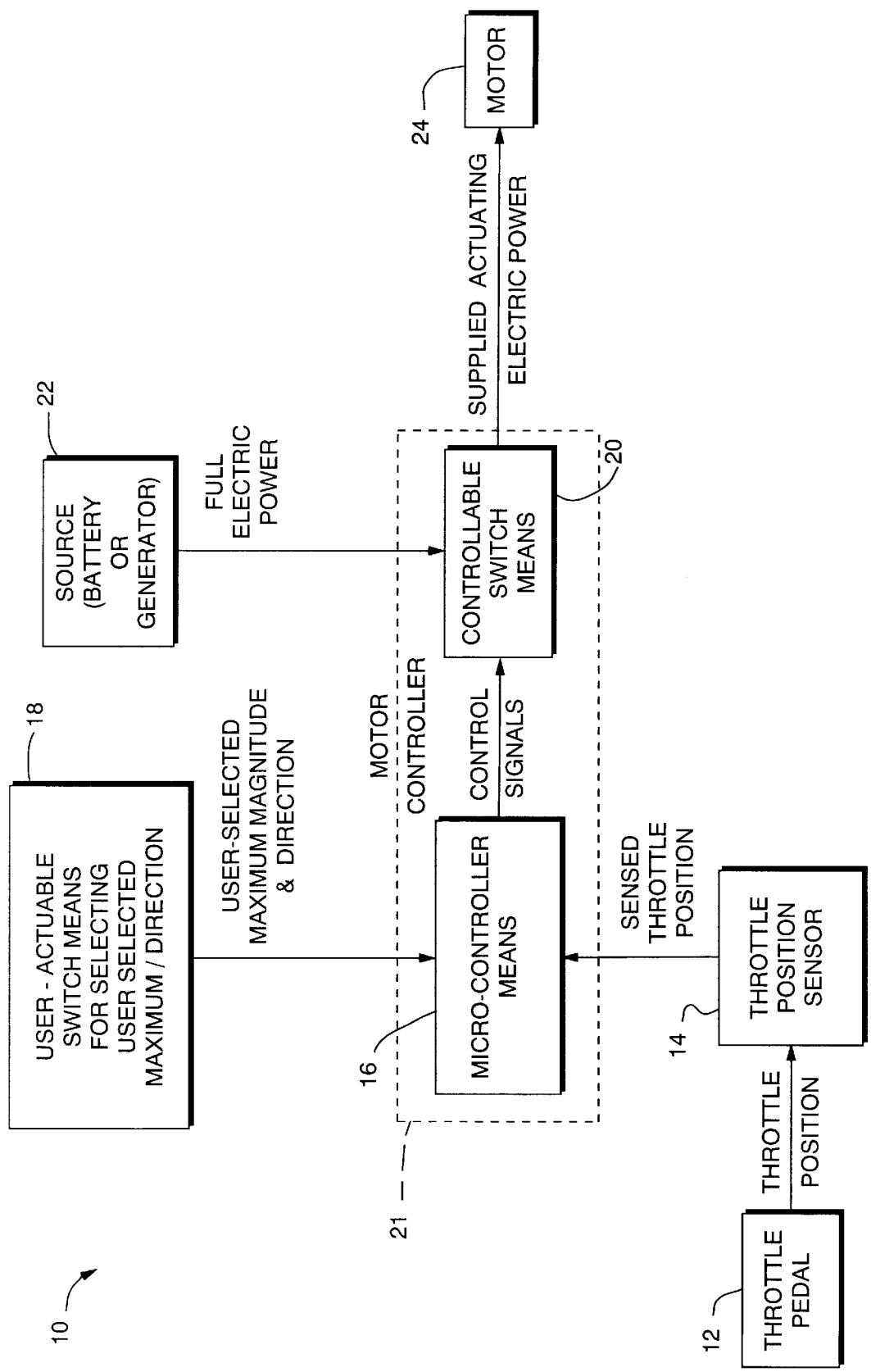
FIG. 1 is an architectural level, functional block diagram of one preferred embodiment of the present invention.

FIG. 1 is a functional block diagram of one preferred embodiment 10 of the present invention. System 10 comprises a throttle 12 for permitting a user (driver) to select a desired magnitude of actuating power to be supplied to the electric motor 24, based upon the position of the throttle. The position of the throttle 12 is sensed by a position sensor 14. Preferably, sensor 14 then generates signals indicative of the position of the throttle 12 and transmits those signals to a microprocessor-based micro-controller means 16. User-actuable switch 18 also generates and transmits signals to the controller 16, these signals being indicative of a desired maximum level and direction of actuating power to be supplied to the motor 24. As will be discussed more fully below, motor controller 21 (which comprises micro-controller 16 and conventional controllable power switch 20) then uses the signals generated by the position sensor 14 and the user-actuable switch 18 to control magnitude and direction of power flow from power source 22 to motor 24.

Preferably, controllable power switch 20 comprises a plurality of conventional, totempole-type, complementary logic power transistors and associated power-control circuitry, for permitting the amount and direction power flow through the switch 20 from source 22 to motor 24 to be controlled based upon the control signals supplied to the switch 20 from the controller 16, although other types and configurations of power control circuitry may be used in this embodiment of the present invention without departing therefrom. The control signals supplied to the switch 20 by the controller 16 cause switch 20 to allow a magnitude of actuating power specified by the control signals to be supplied from the source 22 to the motor 24.

Electrical power source 22 preferably comprises a conventional battery pack electric power supply and/or hybrid electric power supply for supplying electric power to motor 24 via switch 20.

Motor 24 preferably comprises a conventional electric-powered, reversible motor. Preferably, the output torque generated by the motor 24 is substantially linearly proportional to the magnitude of actuating power supplied to the motor 24 by the switch 20. Also preferably, the direction of output torque generated by the motor 24 is related to the direction of actuating power flow supplied to the motor 24 via the switch 20 (i.e., the direction in which the motor 24 turns depends upon the direction of current flow of the electrical energy being supplied to the motor 24 via the switch 20). Alternatively, however, the motor 24 may have a separate, controllable switch (not shown) for receiving other control signals from the controller 16 for controlling in which direction the motor 24 turns. In this alternative case, the direction of motor torque is controlled via the other control signals generated by the controller 16 and not by the direction of actuating power supplied via the switch 20. Thus, in this alternative case, it is unnecessary for the switch 20 to control direction of flow of power supplied to the motor 24, and the construction of the switch 20 and content of the control signals supplied to the switch 20 from the controller 16 are appropriately modified to take this into account (e.g., both the structures needed to permit the switch 20 to be able to control direction of flow of actuating power supplied to the motor 24 and the portions of the control signals needed to control these structures in the switch 20 may be eliminated).

As will be described more fully below, in accordance with this embodiment of the present invention, the micro-controller means 16 is adapted (e.g., programmed and/or constructed) to generate control signals for controlling the switch 20 to cause the magnitude of actuating power supplied from source 22 to motor 24 via switch 20 to be a continuous, substantially linear function of the position of the throttle, when the throttle is within a certain, predetermined range of positions (as determined by the position sensor 14), between zero and the pre-set maximum magnitude selected via means 18 by the user. The micro-controller means 16 is also adapted to override the user-selected maximum magnitude when the throttle is outside the certain range of positions by generating control signals for controlling the switch 20 to cause the magnitude of actuating power supplied to the motor 24 from the source 22 via switch 20 to change as a discontinuous step function to a higher magnitude than the user-selected maximum magnitude.

Figure 2A:
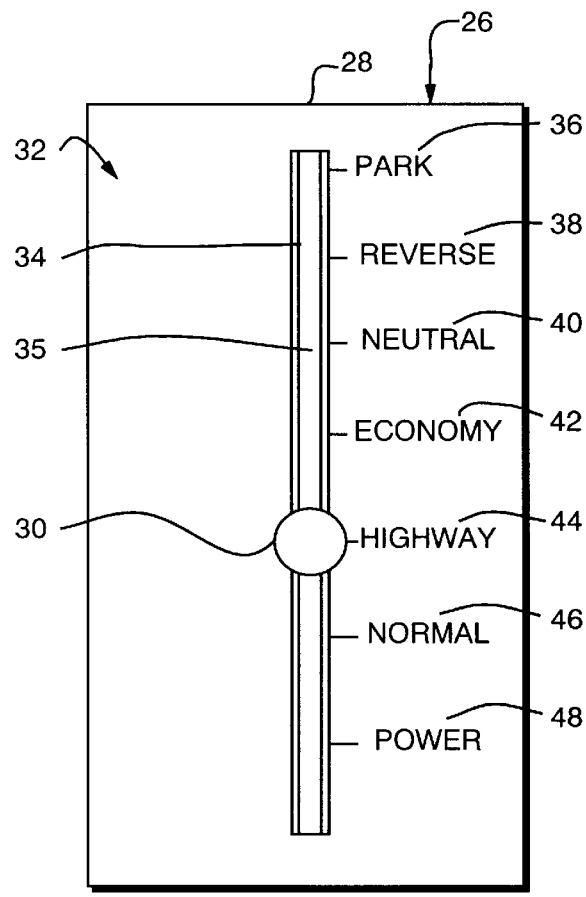
FIG. 2A is a frontal view of the user interface of the user-actuable switch means of the embodiment shown in FIG. 1.

FIG. 2A is a frontal view of a preferred user interface 26 of user-actuable switch means 18. As shown in FIG. 2A, user interface 26 comprises a user-actuated switch 34 comprising knob 30 slidably mounted in a channel track 35. Indicator face plate 32 is mounted to the front face 28 of the interface 26 includes a plurality of discrete maximum magnitude power settings 36, 38, . . . 48. By applying force to the knob 30 a user may change the position of the knob 30 in the track 35 and move the knob 30 into position next to one of a plurality of positions 36, 38 . . . 48, so as to select from among the maximum power settings PARK, REVERSE, . . . POWER associated with positions 36, 38, . . . 48, respectively, a desired maximum magnitude of actuating power to be supplied to the motor 24. Switch 18 includes one or more conventional switching mechanisms and/or potentiometers, etc. (not shown) for generating signals for being supplied to the controller 16 that are indicative of the position of the knob 30 in the track 35. As will be described more fully below, the signals generated by the switch 18 are used by the controller 16 to set a maximum level of actuating power to be supplied to the motor 24 by the system 10.

Figure 2B:
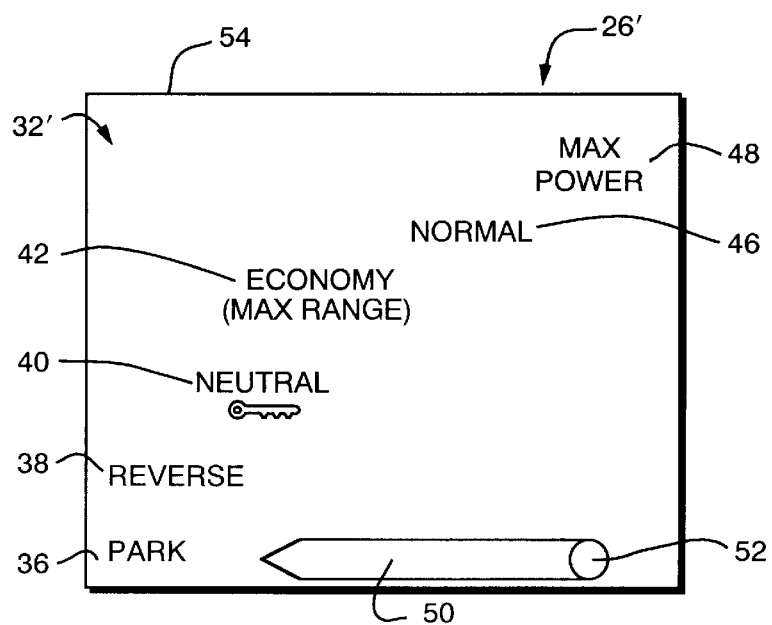
FIG. 2B is a frontal view of a variation of the user interface shown in FIG. 2A.

A variation of interface 26 is shown in FIG. 2B and referenced as 26'. Unless specifically stated to the contrary, the components and operation of interface 26' are substantially identical to those of interface 26. Interface 26' includes wiper switch 50 movably mounted on the front face 54 of switch 18 by conventional means 52 so as to be movable into a plurality of discrete positions 36, 38, . . . 48 indicative of a plurality of different magnitudes of actuating power PARK, REVERSE, . . . POWER, respectively. Indicator face plate 32' is mounted on the front face 54 of the switch 18 and includes indications of the magnitudes of actuating power PARK, REVERSE, . . . POWER in positions 36, 38, . . . 48, respectively. Thus, a user may select a desired maximum level of actuating power to be supplied to the motor 24 by moving the wiper switch 50 to one of the positions 36, 38, . . . 48 wherein the desired maximum power level is indicated. Switch 50 is connected to conventional circuitry (not shown) of the type discussed above in connection with interface means 26 for generating signals for being supplied to the controller 16 that are indicative of which of the positions 36, 38, . . . 48 switch 50 is located. Preferably, switch 50 is discretely movable between the PARK 36 and REVERSE 38 positions, between the REVERSE 38 and NEUTRAL 40 positions, and between the NEUTRAL 40 and ECONOMY 42 positions. Also preferably, switch 50 is continuously movable among the ECONOMY 42, NORMAL 46, and MAX POWER 48 positions. When switch 50 is among forward power settings 42, 46, and 48, the maximum power level selected by the switch 18 is substantially a continuous linear function of the position of switch 50 between the power levels associated with the forward power settings between which switch 50 is located. Conversely, in this embodiment, when switch 50 is moved from the ECONOMY setting 42 to the NEUTRAL setting 40, from the NEUTRAL setting 40 to REVERSE setting 38, or from the REVERSE setting 38 to the PARK setting 36, the maximum power levels selected by the switch 18 change discontinuously (i.e., abruptly) to the maximum power levels associated with these settings, which associated maximum power levels will be described below.

Figure 3:
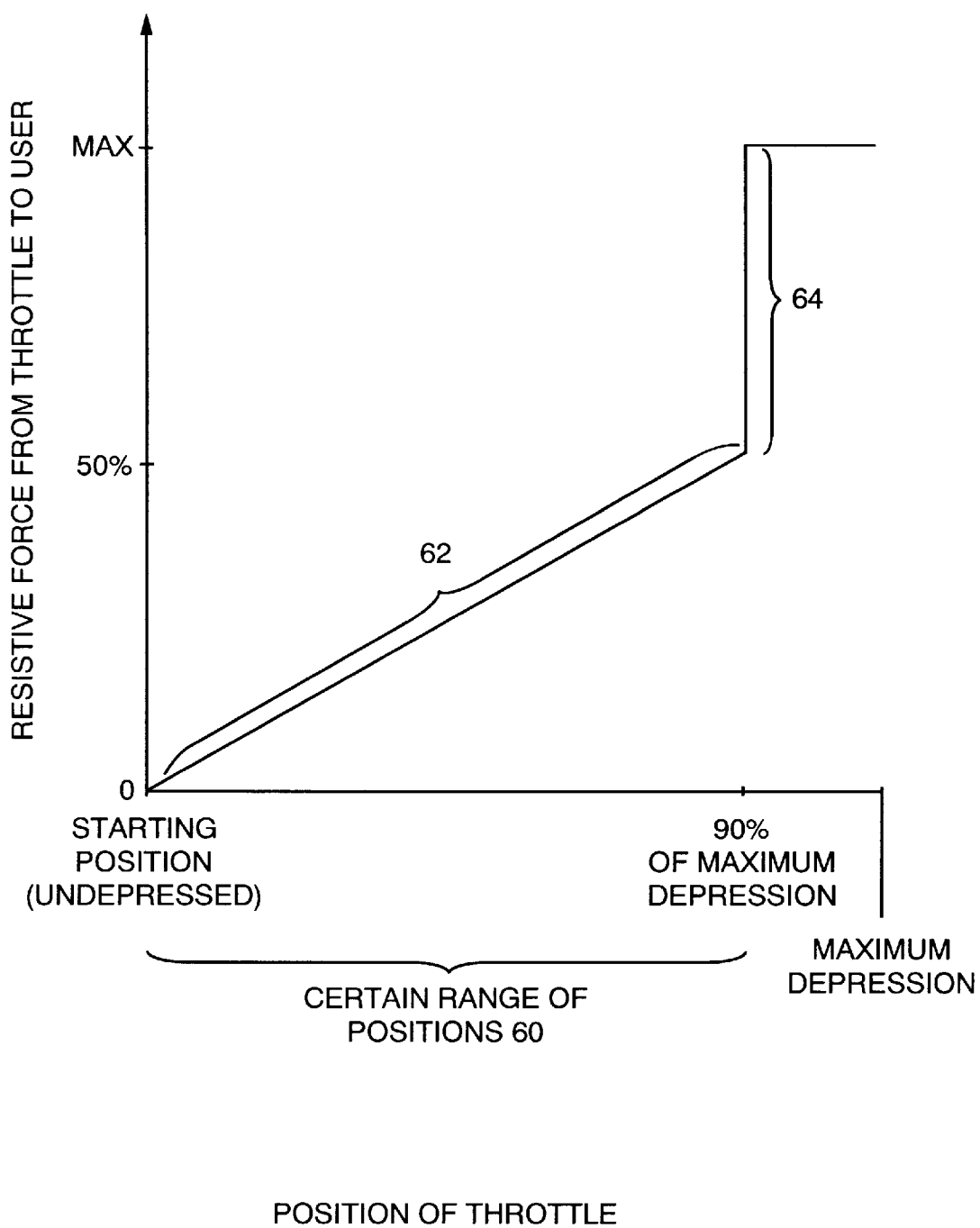
FIG. 3 is a graph illustrating the resistive force applied to the user from the throttle vs. throttle position characteristics of the preferred embodiment of FIG. 1.
Figure 4:
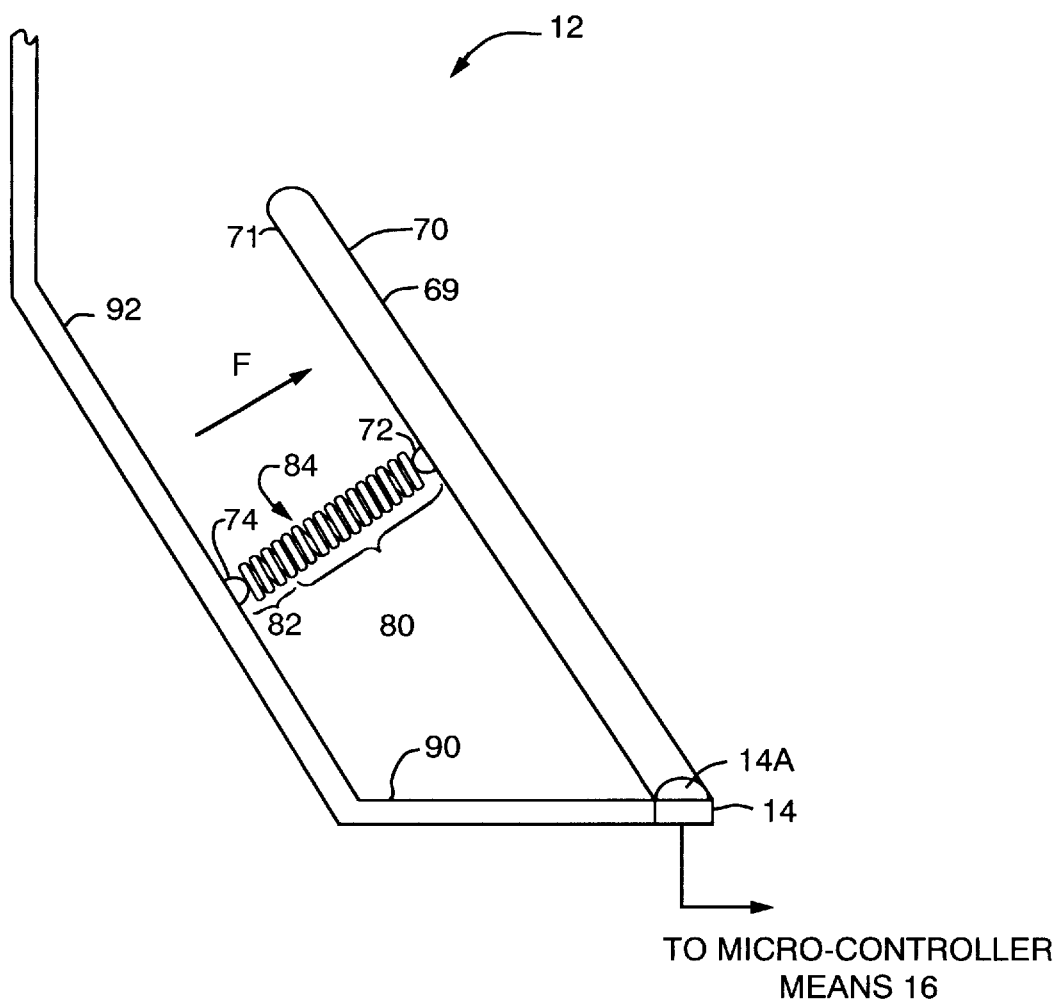
FIG. 4 is a schematic diagram of the construction of throttle of the preferred embodiment shown in FIG. 1, shown in conjunction with the sensor of said preferred embodiment.

Turning now to FIGS. 3 and 4, the operation of one preferred construction of the throttle 12 and position sensor 14 will now be described. Throttle 12 preferably comprises an accelerator pedal 70 having a top surface 69 for being contacted by a user's foot (not shown) and a bottom surface 71 to which is connected one end of a biasing spring 84 via conventional connecting means 72. The other end of spring 84 is connected to one portion 92 of the passenger compartment bulkhead via conventional connecting means 74. Spring 84 comprises two linear regions 80, 82 having different spring constants. Preferably, for reasons that will be described more fully below, the spring constant of region 82 is substantially larger than that of region 80. It should be understood that although not shown explicitly in FIG. 4 for purposes of simplicity, spring 84 preferably is contained within a telescoping cylinder or other similar structure mounted to the underside 71 of pedal 70 and portion 92 of the vehicle bulkhead. Preferably, portion 92 of the vehicle bulkhead is oriented so as to be substantially parallel to the pedal 70 when the pedal is in its starting position (i.e., undepressed state). Also preferably, spring 84 is connected to side 71 and bulkhead portion 92 so as to be at a substantially right angle to both side 71 and portion 92. Bulkhead portion 92 is connected to position sensor 14 via bulkhead portion 90. Sensor 14 (e.g., a conventional micro-switch-type position sensor) is connected to the bottom of pedal 70 via conventional micro-switch hinge 14A, and senses the position (i.e., how much the pedal is depressed) of the pedal 70. The sensor 14 generates signals representative of the sensed positioned of the pedal 70 and transmits those signals to the controller 16.

Biasing spring 84 applies a biasing force to pedal 70. In the absence of depressing force (i.e., force applied to depress the pedal 70 toward the bulkhead portion 92) applied to the pedal 70 by the user's foot, spring 84 applies force F to pedal 70 that urges pedal 70 to remain in an initial starting (i.e., undepressed) position. Upon application of depressing force to the pedal 70, spring 84 generates a resistance force F that resists the depressing force applied to the pedal 70 by the user. Preferably, the spring constants and lengths of the two regions 80, 82 of the spring 84 are adapted to generate a substantially linear resistance force F so long as the pedal 70 is within a certain range of positions 60 (e.g., as shown in FIG. 3, between the pedal's initial starting position and 90 percent of its maximum depressed position). This linear resistance force region is shown graphically in FIG. 3 and is referred to by numeral 62. Preferably, the magnitude of the linear force varies between zero and about 50 percent of the maximum magnitude of resistance force F applied to the user by the spring 84.

Preferably, the spring constants and lengths of the two regions 80, 82 of the spring 84 are also adapted to cause the resistive force F applied to the user by the spring 84 to change as a discontinuous step function when the position of the pedal is outside the certain range of positions (i.e., depression of the pedal exceeds 90 percent of the maximum possible depression). Preferably, at this point, the resistive force F applied to the user jumps discontinuously to substantially the maximum possible resistive force for the spring 84. This discontinuous jump (as a step function) in the resistive force is illustrated in FIG. 3 and is referred to by numeral 64.

Figure 5:
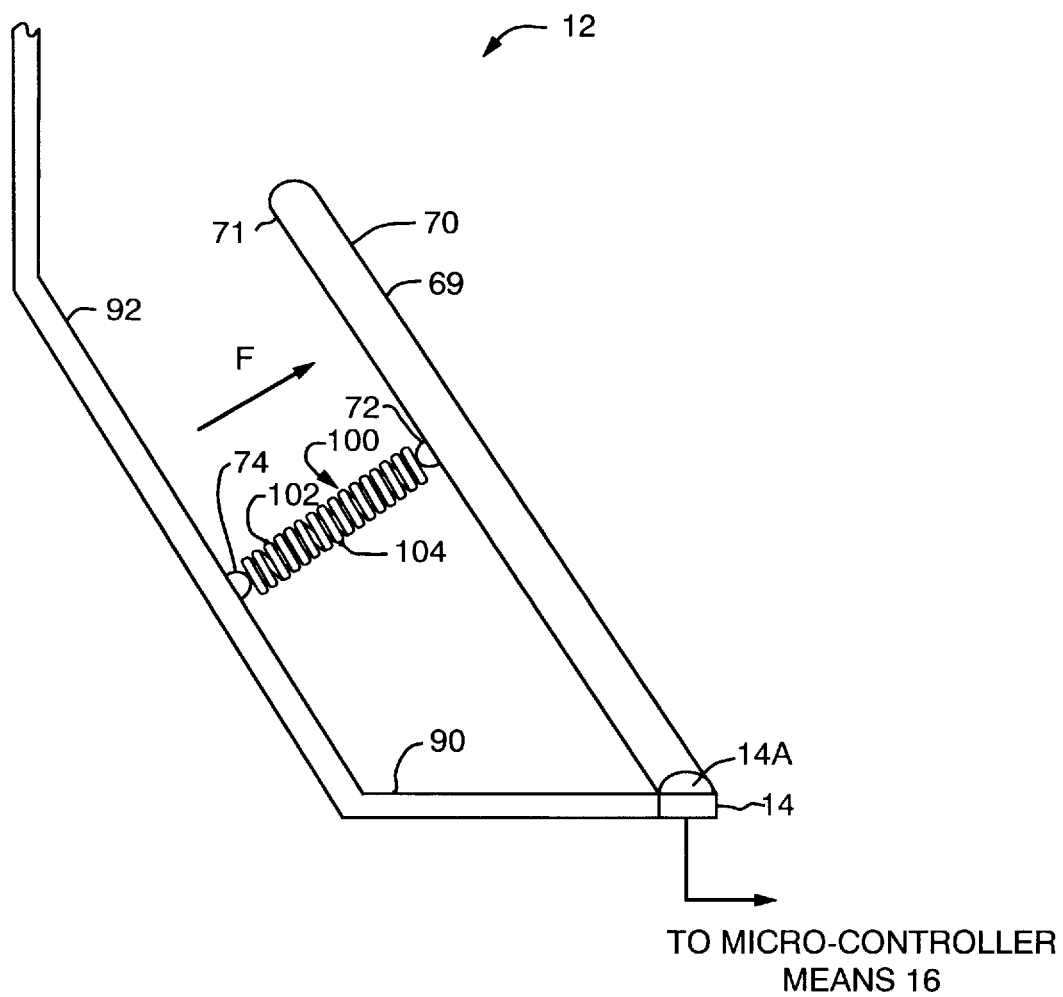
FIG. 5 is a schematic diagram showing the construction of a variation of the throttle shown in FIG. 4.

FIG. 5 is a schematic diagram of a variation of the preferred construction of the throttle shown in FIG. 4. Unless specifically stated to the contrary, it should be understood that the construction and operation of the throttle shown in FIG. 5 is substantially identical to those of the throttle of FIG. 4. In contrast to the construction shown in FIG. 4, however, the single spring 84 of throttle 12 shown in FIG. 4 is replaced with two separate springs 100, 102 connected together by conventional means (e.g., weld 104). Preferably, the lengths and spring constants of springs 100, 102 are chosen so as to permit the throttle to operate in the manner discussed above in connection with the construction shown in FIG. 4, and also so as to exhibit the resistive force characteristics shown in FIG. 3.

Figure 6:
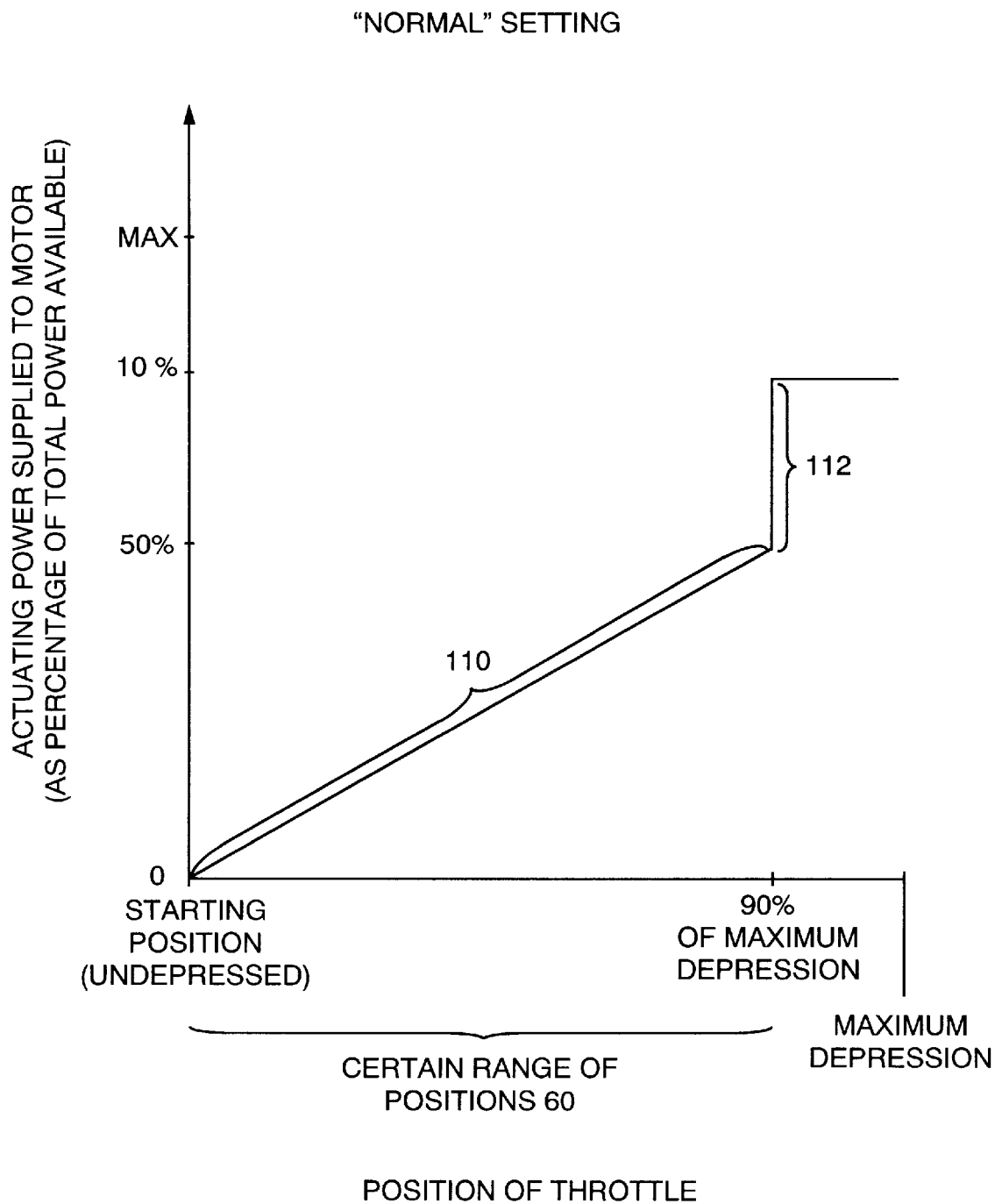
FIG. 6 is a plot of the actuating power supplied to the motor vs. throttle position characteristics of the preferred embodiment of FIG. 1, when the user-actuable selector means is set to the "Normal" setting.

Preferably, switch 18 includes potentiometer and/or electro-mechanical switching mechanisms (not shown) for generating signals indicative of the maximum actuating power level selected by the user. The signals generated by the switch 18 indicative of the maximum actuating power level selected by the user are transmitted to the controller 16. Preferably, in this embodiment, the controller 18 then uses these signals and those transmitted to the controller 16 from the sensor 14 indicative of the sensed position of the throttle 12 to generate and transmit control signals to the power switch 20 to control the magnitude and direction of actuating power supplied to the motor 24. Preferably, the controller generates the control signals in accordance with the following:

For the following discussion, particular reference should be made to FIGS. 6–9. As shown in FIG. 6, when the user-actuating switch 18 is set to the "NORMAL" setting and the pedal 70 is within the certain range of positions (e.g., between its undepressed state and 90 percent of maximum depression), the controller 16 supplies control signals to the power switch 20 for causing the switch 20 to admit actuating power to the motor 24 having a magnitude that varies as a linear function (represented by 110 in FIG. 6) of the position of the pedal 70. In this linear region 110, the magnitude of supplied actuating power varies between zero and 50 percent of the maximum magnitude of power that can be supplied by the source 22 to the motor 24. If the switch 18 is set to the "NORMAL" setting and the pedal 70 is outside of the certain range 60, the controller causes the magnitude of actuating power supplied to the motor 24 to be substantially equal to about 70 percent of the maximum power available from the source 22. This discontinuous step or jump in the magnitude of actuating power that occurs when the pedal moves from inside to outside the range of positions 60 is represented by 112 in FIG. 6.

Figure 7:
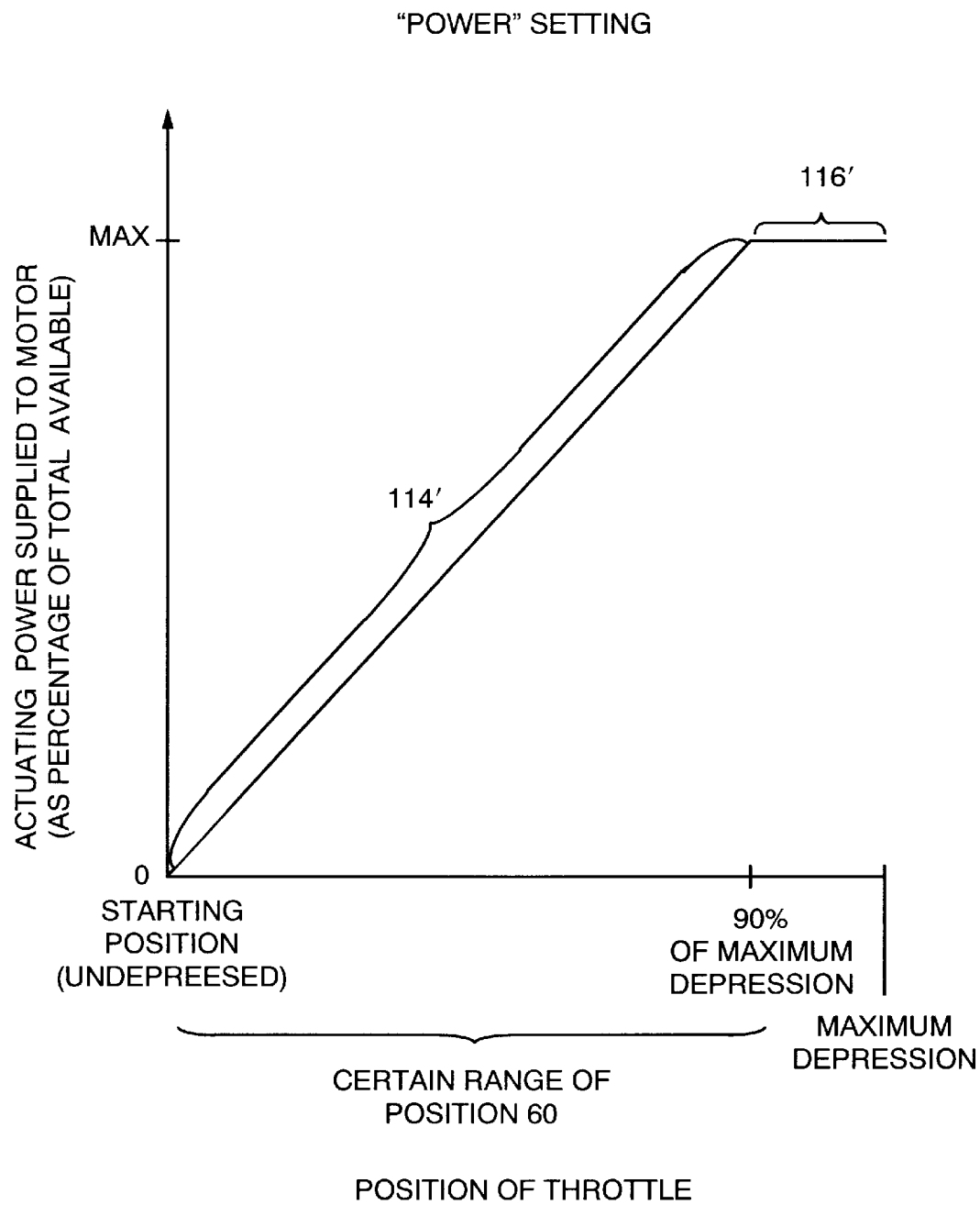
FIG. 7 is a plot of the actuating power supplied to the motor vs. throttle position characteristics of the preferred embodiment of FIG. 1, when the user-actuable selector means is set to the "Power" setting.

As shown in FIG. 7, when the pedal is within the certain range of positions and the user-actuated switch 18 is set to the "POWER" setting, the microprocessor-based controller 16 generates control signals that cause the power supplied to the motor to be a substantially linear function of the position of the pedal, from a value of zero up to the maximum value of power available from the source 22. This linear range of operation is referred to by 114 in FIG. 7. When the pedal is outside of the certain range of positions, the controller 16 causes the magnitude of power supplied to the motor to remain at a constant level equal to the maximum power available from the source 22. This constant range of operation is referred to by numeral 116 in FIG. 7.

Figure 8:
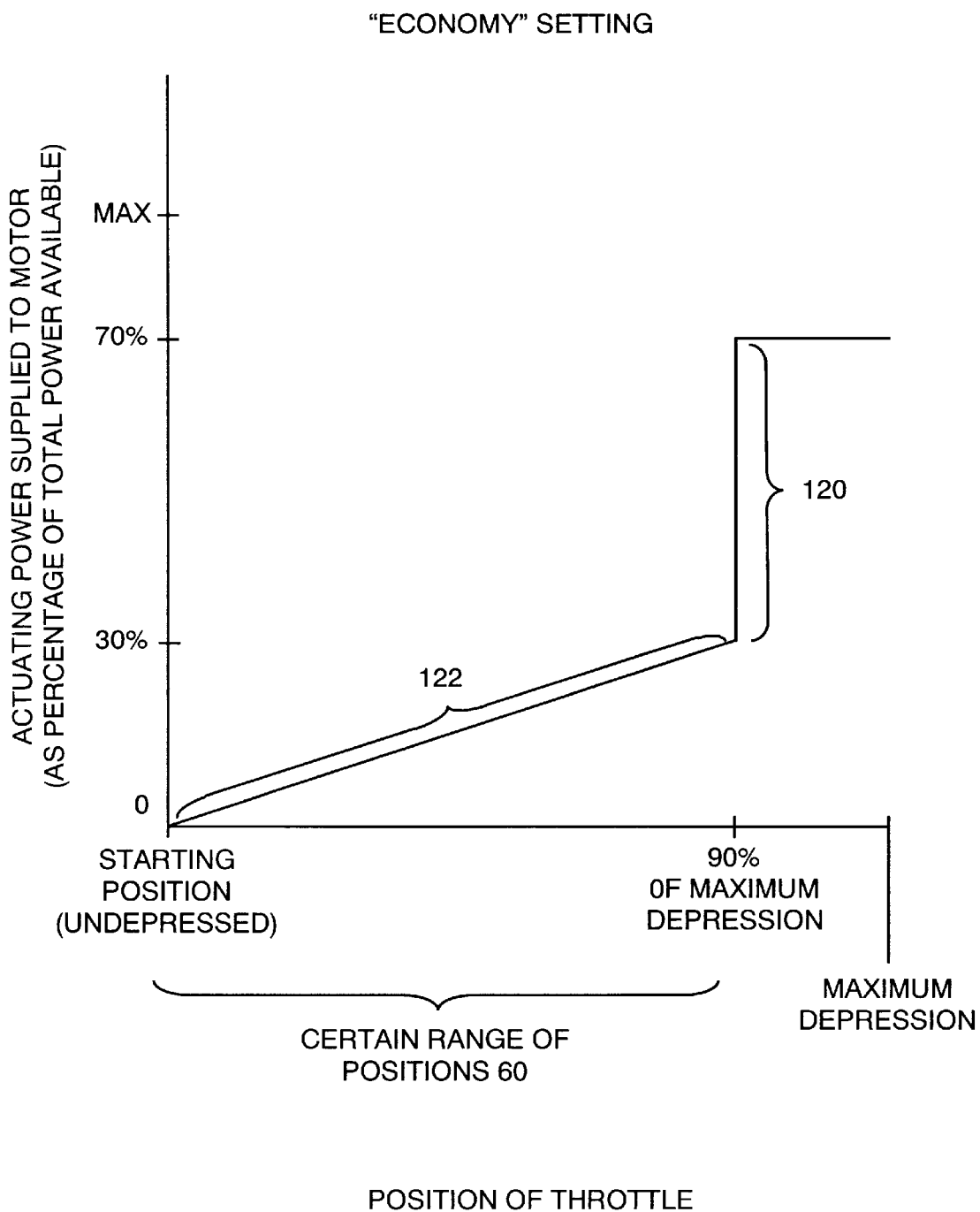
FIG. 8 is a plot of the actuating power supplied to the motor vs. throttle position characteristics of the preferred embodiment of FIG. 1, when the user-actuable selector means is set to the "Economy" setting.

As shown in FIG. 8, when the pedal is within the certain range of positions and the user-actuated switch 18 is set to the "ECONOMY" setting, the controller 16 causes the magnitude of actuating power supplied to the motor to vary as a linear function of the position of the pedal. While in this linear range of operation 122, the magnitude of power supplied to the motor is within the motor's most efficient operating range, so as to maximize the range of the vehicle between replenishings of the power source, and in this embodiment is between a value of zero and about 30 percent of the maximum power available from the source 22. When the pedal is outside of the certain range of positions, the controller causes the amount of power supplied to the motor to discontinuously step up to about 70 percent of the available power of the source. This step-up in magnitude of supplied power is referred to by numeral 120 in FIG. 8.

Figure 9:
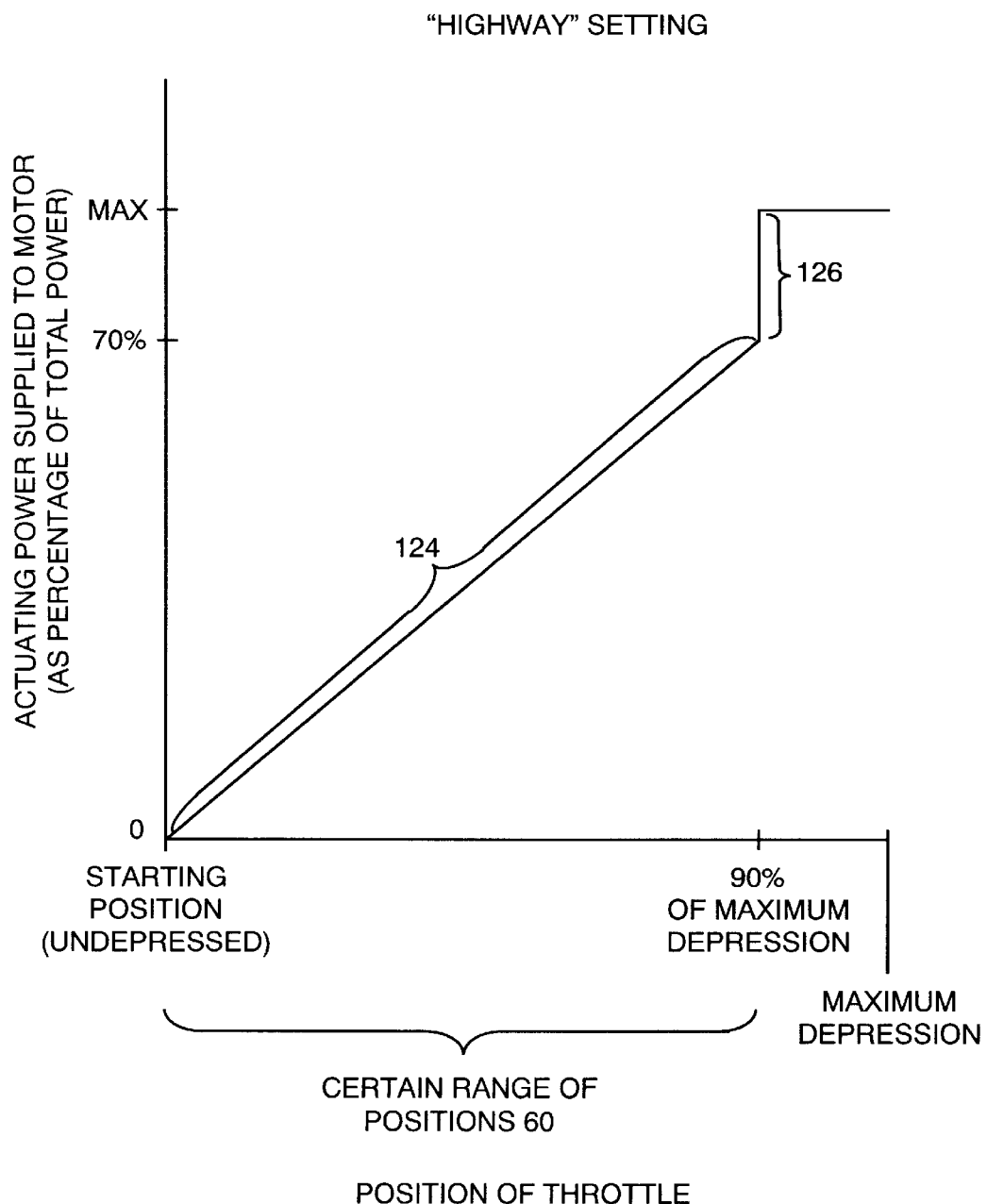
FIG. 9 is a plot of the actuating power supplied to the motor vs. throttle position characteristics of the preferred embodiment of FIG. 1, when the user-actuable selector means is set to the "Highway" setting.

As shown in FIG. 9, when the pedal is within the certain range of positions 60 and the user-actuated switch 18 is set to "HIGHWAY" setting, the controller causes the magnitude of power supplied to the motor to vary as a linear function of the position of the pedal, between the values of zero and 70 percent of the maximum power available from the source 22. This linear range of operation is shown as 124 in FIG. 9. When the pedal is outside the certain range of positions, the controller causes the magnitude of power supplied to the motor to step up to the maximum power available from the source 22. This discontinuous step-up in the magnitude of supplied power is referred to by 126 in FIG. 9.

Figure 10:
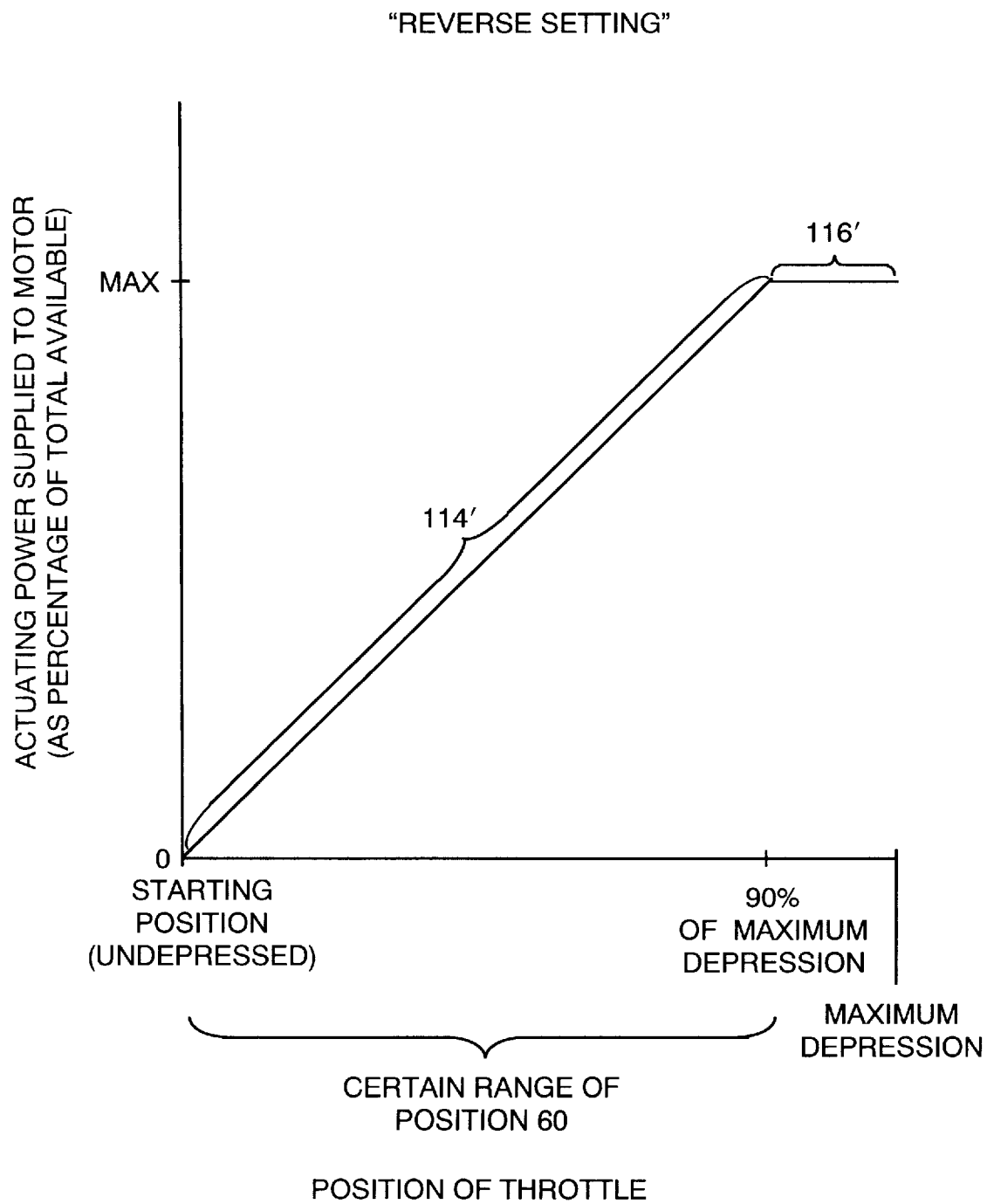
FIG. 10 is a plot of the actuating power supplied to the motor vs. throttle position characteristics of the preferred embodiment of FIG. 1, when the user-actuable selector means 18 is set to the "Reverse" setting.

As shown in FIG. 10, when the user-actuated switch 18 is set to "REVERSE" and the pedal is within the certain range of positions, the controller is adapted to cause the amount of power supplied to the motor to vary linearly as a function of the position of the pedal, between zero and the maximum amount of power available from the source 22. (See 114' in FIG. 10) When the pedal is outside the range of the positions 60, the amount of power supplied to the motor is substantially equal to the maximum power available from the source 22. (See 116' in FIG. 10). Alternatively, the controller may be precalibrated to linearly vary the amount of power supplied to the motor between the values of zero and the amount of power necessary to drive the vehicle at 15 miles per hour. In any event, unless the system 10 is modified in the manner discussed previously, when the switch 18 is set to "REVERSE", the direction of power supplied to the motor 24 is the opposite from the direction of power supplied to the motor when the switch 18 is set to "NORMAL", "POWER", "ECONOMY", and "HIGHWAY."

When the user-actuated switch 18 is set to "PARK", the controller disconnects the power supply to the motor. When the switch 18 is set to NEUTRAL, the controller disconnects the power supply to the motor.

Thus, it is evident that there has been provided in accordance with the present invention a vehicle drive control system that fully satisfies both the aims and objectives hereinbefore set forth. It should be appreciated that although the present invention has been described in connection with preferred embodiments thereof many modifications, alternatives, and variations will be apparent to those skilled in the art. For example, the specific percentages and magnitudes of power to be supplied to the motor 24 by system 10 should be viewed as being illustrative of preferred percentages and magnitudes thereof, and may vary significantly depending upon other design constraints, such as the type and size of vehicle and/or motor. Thus, the present invention should not be viewed as being limited to only the specific percentages and magnitudes of power stated herein.

Additionally, the specific range of positions (i.e., from starting position to 90 percent of maximum depression) of the throttle comprised within the certain range of positions defined herein should not be viewed as limiting the present invention to this specific range of positions. Moreover, the user-actuated switch 18 should not be viewed as being limited solely to the structure illustrated herein and structural equivalents thereof. Rather, user-actuated switch 18 should be viewed as having a scope that encompasses all functional equivalents to the specific switch means 18 illustrated herein.

Also, although the means 26, 26' have been described in connection with use with specific throttle means 12 in preferred embodiment 10 of the present invention, it should be appreciated that embodiment 10 could be modified so as to use means 26, 26' with other types of throttle means (not shown), including conventional foot pedal throttles, without departing from the present invention. In such a modification (i.e., wherein embodiment 10 is modified such that the means 26, 26' is used with a conventional throttle), the controller 16 may be adapted to cause the magnitude of forward power supplied to the motor from the source to vary as shown in FIG. 11.

Figure 11:
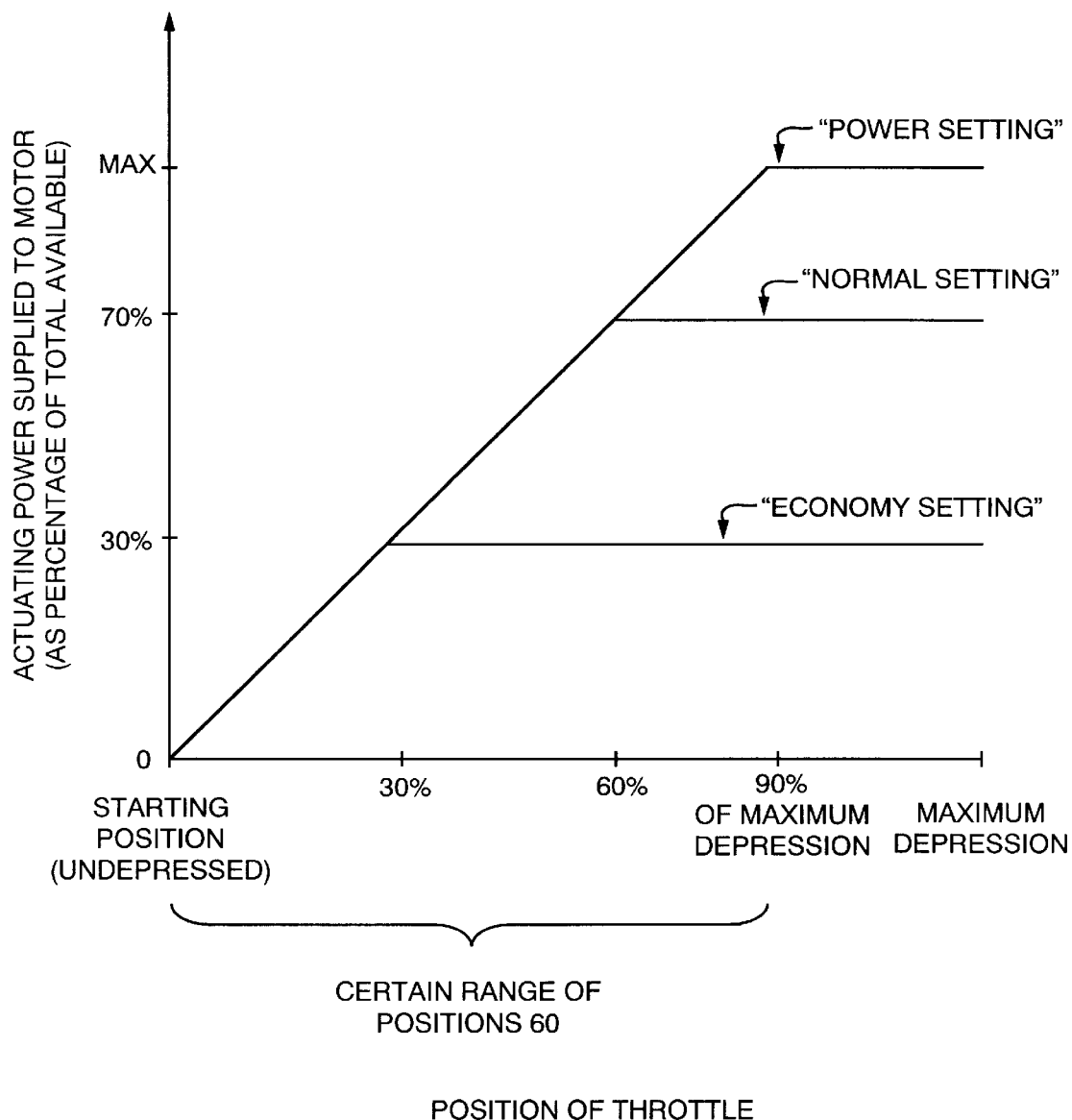
FIG. 11 is a plot of the actuating power supplied to the motor vs. throttle position characteristics of a modification of the preferred embodiment of FIG. 1.

As shown in FIG. 11, in the aforesaid modification of embodiment 10, when the means 26, 26' is set to a given maximum forward power setting, the magnitude of forward power supplied to the motor varies as a continuous (linear or non-linear) ramp function of position of the throttle between zero and the maximum value of power associated with that setting so long as the throttle is within a predetermined range of positions associated with the given power setting, and when the throttle is outside of the associated predetermined range of positions, the power supplied to the motor remains constant at the maximum value of power associated with the setting of the means 26, 26'. In this modification, each power setting of the means 26, 26' is associated with its own different predetermined range of positions of the throttle wherein the magnitude of power supplied to the motor varies as a continuous ramp function of the position of the throttle.

Similarly, it should be understood that embodiment 10 could be modified so as to use the throttle means 12 without the means 26, 26'. In this latter type of modification, the the controller 16 may be adapted to generate control signals that cause the power supplied to the motor to be a substantially linear function of function of the position of the pedal, from a value of zero up to a permanent, pre-set maximum value of power to be supplied from the source 22 (e.g., equal to about 70 percent of the maximum value of power available from the source 22). When the pedal is outside of the certain range of positions, the controller 16 may be adapted to cause the magnitude of power supplied to the motor to discontinuously step up to maximum power available from the source 22.

Moreover, although the magnitude of power supplied to the motor in embodiment 10 have been described as increasing as a substantially continuous linear function of the position of the throttle when the throttle is within the predetermined range of positions, it should be appreciated that embodiment 10 may be modified so that the magnitude of power supplied to the motor may increase in accordance with other types of continuous functions of position of the throttle when the throttle is within the predetermined range of positions, without departing from the present invention. For example, embodiment 10 may be modified so that the magnitude of power supplied to the motor may vary as a continuous non-linear (e.g., hyperbolic in shape) ramp function related to the position of the throttle within the predetermined range of positions. Also, throttle means 12 may be modified so that the resistance force applied to the user may vary in a manner different from that illustrated in FIG. 3. For example, throttle 12 may be modified so that the resistance force applied to the user when the throttle is outside of the predetermined range of positions changes as a ramp function, whose slope differs from that of ramp section 62, between about 50% of the maximum resistive force and the maximum resistive force.

Yet other modifications are also possible without departing from the present invention. For example, the controller 16 may be adapted to be able to determine whether a given magnitude of power requested by a user (i.e., via the throttle) to be supplied to the motor will cause the motor to operate below a predetermined level of efficiency. When the switch 18 is set to a setting other than the MAX POWER setting 48, the controller 16 may be adapted to prevent this given magnitude of power from being supplied to the motor, and instead to supply to the motor a different magnitude of power that will not cause the motor to operate below the predetermined level of efficiency.

Additional modifications are also possible without departing from the present invention. Thus, the present invention should be viewed broadly, as being limited only as set forth in the hereinafter appended claims.

What is claimed is:

1. A system for controlling supply of actuating power to an electric motor for driving a vehicle, and comprising, a controller for causing a magnitude of actuating power to be supplied to said motor based upon position of a throttle, the magnitude of actuating power supplied to said motor changing as a substantially continuous function of the position of the throttle up to a user-selected maximum magnitude of power when said throttle is within a certain range of positions, said controller also permitting said user-selected maximum magnitude to be overridden when said throttle is outside said certain range by causing the magnitude of actuating power to change as a discontinuous step function to a higher magnitude than said user-selected maximum magnitude, said throttle including a force-resisting mechanism for resisting force applied to said throttle by said user to select the position of said throttle, said mechanism exhibiting a resistance to said force that changes as a step function when said throttle moves from inside said certain range of positions to outside said certain range of positions and vice versa.

2. A system according to claim 1, wherein said throttle comprises at least one biasing spring for resisting said force applied to said throttle by said user to select said position of said throttle, said spring including at least first and second regions having different spring constants and being for causing said resistance to said force to change as said step function when said throttle moves from inside said certain range of positions to outside said certain range of positions and vice versa.

3. A system according to claim 1, and further comprising, user-actuable switch for permitting a user to select said user-selected maximum magnitude from a plurality of available maximum magnitudes.

4. A system according to claim 1, and further comprising, a selection mechanism for permitting a user to select said user-selected maximum magnitude including a switch movable into a plurality of discrete positions for permitting said user to select said user-selected maximum magnitude by moving said switch into one of said plurality of discrete positions.

5. A system according to claim 3, wherein said higher magnitude is the largest one of said plurality of maximum magnitudes of power.

6. A system according to claim 1, and further comprising, a throttle position sensor for sensing the position of said throttle.

7. A system according to claim 2, wherein said throttle comprises a foot pedal attached to said spring.

8. A system according to claim 1, wherein said throttle comprises at least first and second biasing springs for resisting said force applied to said throttle by said user to select said position of said throttle, said first and second springs each being for causing said resistance to said force to change as said step function when said throttle moves from inside said certain range of positions to outside said certain range of positions and vice versa.

9. A system according to claim 8, wherein said first and second springs are pretensioned against different respective stops.

10. A system according to claim 1, wherein, when said throttle is within said certain range of positions, the magnitude of actuating power supplied to said motor varies as a substantially linear function of said position of said throttle between values of zero and said user-selected maximum magnitude.

11. A system for controlling supply of power to an electric motor for driving a vehicle, and comprising, user-actuable switch having a plurality of settings corresponding to a plurality of maximum magnitudes of power to be supplied to said motor, a foot-actuated pedal for permitting a user to select a desired magnitude of power to be supplied to said motor based upon position of said pedal, and a controller for causing an actual magnitude of power to be supplied to motor, said actual magnitude of power being less than said one maximum magnitude selected via said user-actuable switch by said user when said position of said pedal is within a predetermined range of positions, said actual magnitude of power being substantially equal to the greatest one of said maximum magnitudes of power when said pedal is outside of said predetermined range of positions, said pedal including a force-resisting mechanism for resisting force applied to said pedal by said user to select said position of said pedal, said mechanism exhibiting a resistance to said force that changes as a step function when said pedal moves from inside said predetermined range of positions to outside said predetermined range of positions and vice versa.

12. A system according to claim 11, wherein said foot-actuated pedal comprises at least first and second biasing springs for resisting said actuating force applied to said pedal by said user, said first and second springs each being for causing said resistance to said force to change as said step function when said pedal moves from inside said predetermined range of positions to outside said predetermined range of positions and vice versa.

13. A system according to claim 11, wherein said foot-actuated pedal comprises at least one biasing spring for resisting said force applied to said pedal by said user, said spring including at least first and second regions having different spring constants and for causing said resistance to said force to change as said step function when said pedal moves from inside said predetermined range of positions to outside said predetermined range of positions and vice versa.

14. A system for controlling supply of actuating electrical power to an electric motor for driving a vehicle, and comprising, a controller for causing a magnitude of actuating electrical power to be supplied to said motor that is at most equal to a user-selected maximum magnitude of electrical power selected by a user-actuable switch having a plurality of settings corresponding to a plurality of maximum magnitudes of power for driving said vehicle in a forward direction, and a throttle for selecting, by positioning said throttle, a desired magnitude of power to be supplied to said motor that is less than or equal to the user-selected maximum magnitude, said throttle also being for resisting force applied to said pedal by a user to select said position of said throttle with a resistance that changes discontinuously when said throttle moves from inside at least one certain range of positions to outside said at least one certain range of positions of said throttle.

15. A system according to claim 14, wherein said switch is discretely movable between at least two of said settings.

16. A system according to claim 14, wherein said switch is continuously movable between at least two of said settings.

17. A system according to claim 16, wherein the user-selected maximum selected by said switch is substantially linearly related to position of said switch between said at least two settings.

18. A system according to claim 14, wherein said controller is adapted to prevent said motor from operating below a desired level of efficiency when said switch is in a certain position.

19. A system according to claim 14, wherein said controller is also for preventing said motor from causing said vehicle to exceed a desired velocity when said switch is in one certain position.

20. A system according to claim 14, wherein said switch includes a first setting for permitting an absolute maximum magnitude of forward power to be supplied to said motor, a second setting for permitting a lesser magnitude of forward power to be supplied to said motor, and a third setting for permitting reverse power to be supplied to said motor for causing said vehicle to drive in reverse.

21. A system according to claim 14, wherein said switch includes a potentiometer for supplying a signal to said controller indicative of setting of said switch.

22. A system according to claim 14, wherein the actuating power is supplied to said motor from an electrical power storage device, and said controller is adapted to maximize length of time said motor can operate using the actuating power available from said storage device when said switch is in a certain position.

23. A system according to claim 14, wherein said throttle comprises a foot pedal.

24. A system for controlling supply of actuating power to an electric motor for driving a vehicle, and comprising, a controller for causing a magnitude of actuating power to be supplied to said motor based upon position of a throttle, the magnitude of actuating power supplied to said motor changing as a substantially continuous function of the position of the throttle up to a pre-selected maximum magnitude of power when said throttle is within a certain range of positions, said controller also permitting said pre-selected maximum magnitude to be overridden when said throttle is outside said certain range by causing the magnitude of actuating power to change as a discontinuous step function to a higher magnitude than said pre-selected maximum magnitude, said throttle also being for resisting force applied to said throttle by a user to select said position of said throttle with a resistance that changes discontinuously when said throttle moves from inside said certain range of positions to outside said certain range of positions.

25. A system according to claim 24, wherein said pre-selected maximum magnitude is substantially equal to 70 percent of the maximum power available to be supplied to said motor.

26. A system according to claim 24, wherein said continuous function comprises a non-linear ramp function related to said position of said throttle.

27. A system according to claim 1, wherein said continuous function comprises a non-linear ramp function related to said position of said throttle.

28. A system according to claim 24, wherein said throttle comprises at least one biasing spring for resisting said force applied to said throttle by said user to select said position of said throttle, said spring including at least first and second regions having different spring constants and being for causing said resistance to said force to change as a step function when said throttle moves from inside said certain range of positions to outside said certain range of positions and vice versa.

29. A system according to claim 14, wherein said desired magnitude of power selected by said throttle varies as a substantially continous function of position of said throttle when said throttle is within a predetermined range of positions associated with the user-selected maximum magnitude of electrical power selected by the user-actuable switch, and said desired magnitude of power selected by said throttle is constant when said throttle is outside of the predetermined range of positions associated with said user-selected maximum magnitude.

30. A system according to claim 29, wherein said settings of said user-actuable switch include at least three forward power settings, and each of said foward power settings is associated with a different respective predetermined range of positions of said throttle within which the desired power selected by said throttle changes a substantially continuous function of the position of said throttle.

* * * * *